United States Patent
Kollath

(10) Patent No.: US 6,758,486 B1
(45) Date of Patent: Jul. 6, 2004

(54) DRAWBAR CLEVIS ASSEMBLY

(75) Inventor: Michael Dean Kollath, La Porte City, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/327,244

(22) Filed: Dec. 20, 2002

(51) Int. Cl.$^7$ .............................................. B60D 1/100
(52) U.S. Cl. ....................... 280/515; 280/504; 280/507; 403/324
(58) Field of Search ................................. 280/515, 504, 280/514, 444, 452, 493, 495, 498, 507; 403/324

(56) References Cited

U.S. PATENT DOCUMENTS

| | | | | |
|---|---|---|---|---|
| 2,593,247 A | * | 4/1952 | Benteman .................... | 280/515 |
| 2,654,613 A | | 10/1953 | Blair et al. ............... | 280/33.15 |
| 2,827,317 A | | 3/1958 | Saulnier ...................... | 287/100 |
| 3,190,677 A | * | 6/1965 | Robbins ...................... | 280/515 |
| 3,843,160 A | | 10/1974 | Frushour et al. ............ | 280/415 |
| 4,298,212 A | * | 11/1981 | Jamison ...................... | 280/515 |
| 4,552,377 A | * | 11/1985 | Folkerts ...................... | 280/515 |
| 4,579,364 A | * | 4/1986 | Kranz ........................ | 280/507 |
| 4,671,528 A | * | 6/1987 | Thompson .................. | 280/504 |
| 4,773,805 A | | 9/1988 | Krahling ..................... | 411/351 |
| 4,783,094 A | * | 11/1988 | Sands ......................... | 280/515 |
| 5,427,399 A | * | 6/1995 | Olson ......................... | 280/515 |
| 5,769,559 A | * | 6/1998 | Olson ...................... | 403/322.1 |
| 6,193,260 B1 | * | 2/2001 | Homan et al. .............. | 280/515 |

OTHER PUBLICATIONS

Deere & Co., Current 8020 and 9020T series drawbar clevis (no date).
Deere & Co., Regular Drawbar with heavy-duty hammer-strap, Aug. 2001.
Deere & Co., Swinging Drawbar, Aug. 2001.
Deere & Co., Three-point hitch and drawbar, 5 pages, Nov. 2001.
Deere & Co., 7810 Clevis/Drawbar Assembly, (no date).

* cited by examiner

*Primary Examiner*—Lesley D. Morris
*Assistant Examiner*—Tony Winner

(57) ABSTRACT

A drawbar clevis assembly is attached to a drawbar having a first bore in an end thereof. The clevis assembly includes a clevis member which has a second bore spaced apart from and aligned with the first bore. The clevis member also has a pair of cross bore aligned with each other and extending generally perpendicularly with respect to the first and second bores. A drawbar pin is insertable through the second bore and into the first bore. The drawbar pin includes a shaft and a plate attached to one end of the shaft. A cross pin movably mounted in the cross bores and engagable with the plate to releasably retain the drawbar pin in the first and second bores. In a first embodiment, the cross pin is removable from the cross bores to permit withdrawal of the drawbar pin from the clevis member and drawbar. In an alternate embodiment, the cross pin is rotatable within the cross bores from a latched position wherein the cross pin engages the plate and retains the drawbar pin in the first and second bores, to an unlatched position wherein the cross pin is spaced apart from the plate to permit withdrawal of the drawbar pin from the first and second bores.

8 Claims, 1 Drawing Sheet

DRAWBAR CLEVIS ASSEMBLY

BACKGROUND

The present invention relates to a drawbar clevis for coupling a towed implement to a tractor drawbar.

Typically, a clevis assembly is attached to a tractor drawbar. A towed implement can be coupled to the clevis with a drawbar pin which passes through the clevis and the drawbar. The coupling part of the towed implement will normally engage the drawbar pin at a location between the drawbar and a part of the clevis. A tractor normally has a PTO shaft which is located at the rear of the tractor and above the drawbar. A clevis design used on a number of current production tractors includes a "drop pin". In a known design, the drawbar pin is retained by a handle which is pivotally coupled to the drawbar pin. In another design, the drawbar pin is held in place by a quick-lock pin which is inserted through the end of the drawbar pin below the drawbar. In another known production design, the drawbar pin is held in place by a "flipper plate" which is rotated upwardly to allow removal of the drawbar pin. In another known production design, used on 7010 series John Deere tractors, there is a plate which is on top of the clevis and mounted underneath a spring. The plate includes a hole which sits over a drawbar pin which has a smaller pin pressed through it at the top. The plate bears down against the ends of this smaller pin to retain the drawbar pin. This design has a tall profile due to the spring. Also, the drawbar pin is subject to frictional wear since it is allowed to rotate.

There must be sufficient clearance between the drawbar and the PTO shaft, and this clearance is governed by formal industry standards. Because drawbars and related components are normally some of the lowest components of a tractor, they can be exposed to crop material such as hay windrows or corn stalks, which can catch on to and be dragged with the tractor and even knock small parts off of a tractor. It would be desirable to have a drawbar clevis design which has sufficient PTO clearance, which has a low profile and which has minimal exposure to crop material.

SUMMARY

Accordingly, an object of this invention is to provide a drawbar clevis design which has a low profile and sufficient PTO clearance.

A further object of the invention is to provide such a drawbar clevis design which has minimal exposure to crop material.

These and other objects are achieved by the present invention, wherein a drawbar clevis assembly is attached to a drawbar having a first bore in an end thereof. The clevis assembly includes a clevis member which has a second bore spaced apart from and aligned with the first bore. The clevis member also has a pair of cross bore aligned with each other and extending generally perpendicularly with respect to the first and second bores. A drawbar pin is insertable through the second bore and into the first bore. The drawbar pin includes a shaft and a plate attached to one end of the shaft. A cross pin extends through the cross bores and is engagable with the plate to releasably retain the drawbar pin in the first and second bores. In a first embodiment, the cross pin is removable from the cross bores to permit withdrawal of the drawbar pin from the clevis member and drawbar. In an alternate embodiment, the cross pin is rotatable within the cross bores from a latched position wherein the cross pin engages the plate and retains the drawbar pin in the first and second bores, to an unlatched position wherein the cross pin is spaced apart from the plate to permit withdrawal of the drawbar pin from the first and second bores.

DETAILED DESCRIPTION

Figure 1:
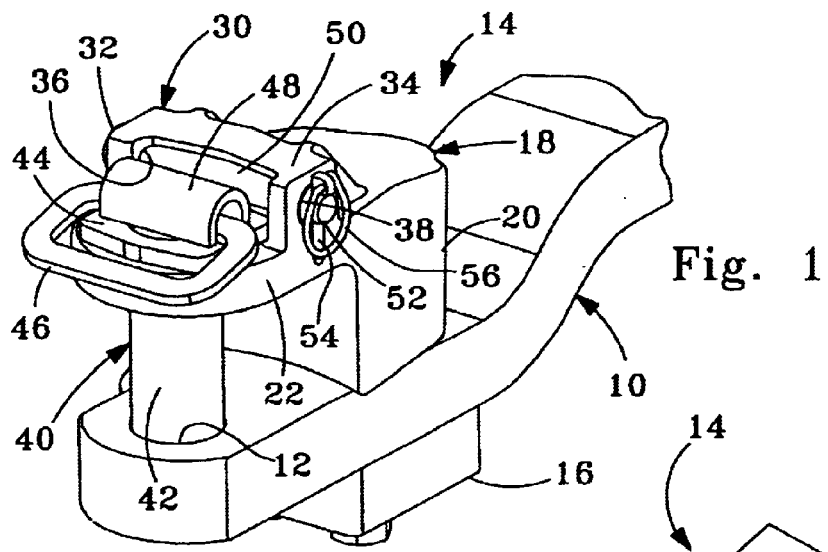
FIG. 1 is a perspective view of drawbar clevis assembly according to the present invention.

Referring to FIG. 1, a drawbar 10 has a bore 12 extending vertically therethrough. A clevis 14 is attached to the drawbar 10 near its aft end. The clevis 14 includes a lower part 16 and an upper part 18. The drawbar 10 is clamped between parts 16 and 18 by bolts (not shown) in a known conventional manner. The upper part 18 includes a clamping member 20 and a flange 22 which projects rearwardly from an upper end of member 20. Flange 22 is spaced apart from and above the end of drawbar 10. Flange 22 includes a vertically extending bore 24 which is aligned with bore 12. Upper part 18 forms a cross pin retainer member 30 which projects above the flange 22 and is located near a forward end of flange 22 and an aft end of member 20. Member 30 includes a pair of spaced apart tabs 32 and 34. A pair of laterally extending bores 36 and 38 are formed in the tabs 32 and 34, respectively.

A drawbar pin 40 has a cylindrical shaft 42 which may be inserted downwardly through bore 24 in flange 22 and into bore 12 of drawbar 10. Drawbar pin 40 also has a plate 44 attached to an upper end of shaft 42. Although not required, the handle 46 may be coupled to the plate 44 by a curved plate 48. Plate 44 has a forward portion which projects into the space between tabs 32 and 34.

A cross pin 50 is removably inserted between tabs 32 and 34 and extends through bores 36 and 38. An end of pin 50 extends outwardly of tab 34 and has a cross bore 52 formed therein. Preferably, pin 50 is releasably retained in place in the bores 36 and 38 by a retaining device such as a quick-lock pin 54 with grasping ring 56. With pin 50 in place as shown in FIG. 1, pin 50 will engage plate 44 and prevent drawbar pin 40 from being removed from bores 12 and 24. With pin 50 removed, plate 44 and drawbar pin 40 can be withdrawn upwardly from bores 12 and 24.

Figure 2:
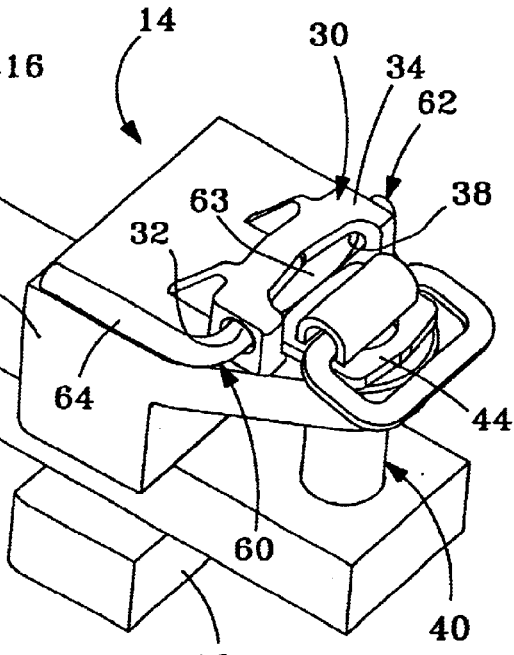
FIG. 2 is a perspective view of an alternate drawbar clevis assembly in a latched condition.

Referring now to FIG. 2, the plate 44 of the drawbar pin 40 is retained by a pivoting pin 60 which is bent and forms a first arm 62 and a second arm 64 at generally right angles with respect to each other. First arm 62 has an inner end received by bore 36 and an outer end received by bore 38. Second arm 64 may be grasped by an operator and manipulated in order to rotate first arm 62 within bores 36 and 38. Preferably, arm 62 is retained in place in the bores 36 and 38 by a retaining device (not shown), such as a quick-lock pin, a roll pin or a spring pin.

Figure 3:
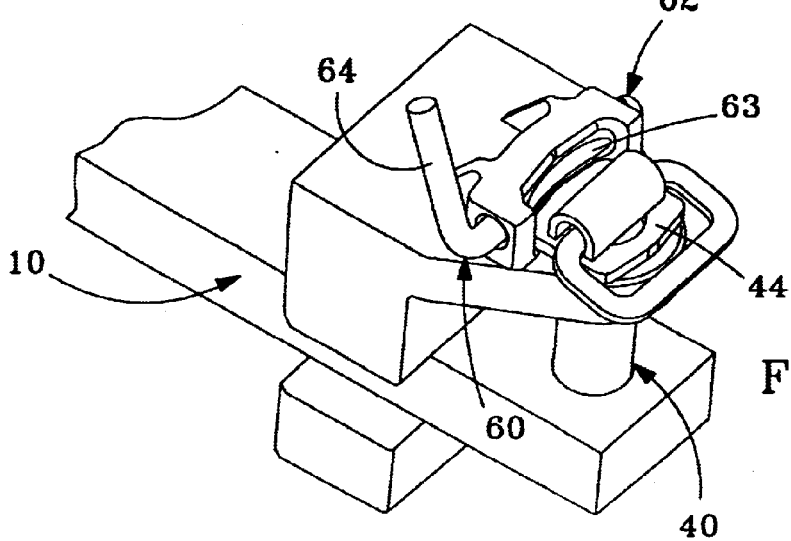
FIG. 3 is a perspective view of the drawbar clevis assembly of FIG. 2 in an unlatched condition.

Arm 62 includes a portion 63 from which material is removed from one side so that arm portion 63 has a non-circular profile or shape. As a result, when arm 64 is oriented generally horizontally, arm 62 overlaps plate 44 and prevents plate 44 and drawbar pin 40 from being withdrawn upwardly. As best seen in FIG. 3, when arm 64 is oriented vertically, arm 62 is spaced rearwardly apart from plate 44 so that plate 44 and drawbar pin 40 can be withdrawn upwardly.

Such cross-pin designs result in a low profile assembly which can provide increased clearance with respect to a PTO driveline. There is no "flipper plate" which must be rotate around and above the top of the drawbar pin. There is also no quick-lock pin at the lower end of the drawbar pin. As a result, the lower end of the drawbar pin can be made flush with the bottom of the drawbar. This eliminates a part that could engage and drag crop material.

It is unlikely that crop material will knock the quick-lock pin off because the quick-lock pin is located in a protected position near the top of the assembly. It is also more convenient to operate a quick-lock pin so positioned and remove the drawbar pin from the clevis.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A drawbar clevis assembly comprising:
    a drawbar having a first bore in an end thereof;
    a clevis member attached to the drawbar and having a second bore spaced apart from and aligned with the first bore, and having a pair of cross bore aligned with each other and extending generally perpendicularly with respect to the first and second bores;
    a drawbar pin which is insertable through the second bore and into the first bore, the drawbar pin having a shaft and a plate attached to one end of the shaft; and
    a cross pin movably mounted in the cross bores and engagable with the plate to releasably retain the drawbar pin in the first and second bores.

2. The drawbar clevis assembly of claim 1, wherein:
    the cross pin is removable from the cross bores to permit withdrawal of the drawbar pin from the clevis member and drawbar.

3. The drawbar clevis assembly of claim 1, wherein:
    the cross pin is rotatable within the cross bores from a latched position wherein the cross pin engages the plate and retains the drawbar pin in the first and second bores, to an unlatched position wherein the cross pin is spaced apart from the plate to permit withdrawal of the drawbar pin from the first and second bores.

4. The drawbar clevis assembly of claim 3, wherein:
    the cross pin is bent to form a first arm and a second arm extending substantially at a right angle with respect to the first arm.

5. The drawbar clevis assembly of claim 4, wherein:
    the second arm may be grasped by an operator and manipulated in order to rotate the first arm within the cross bores.

6. The drawbar clevis assembly of claim 3, wherein:
    the cross pin is bent to form a first arm and a second arm extending at an angle with respect to the first arm, the first arm being rotatably received by the cross bores.

7. The drawbar clevis assembly of claim 6, wherein:
    the second arm may be grasped by an operator and manipulated in order to rotate the first arm within the cross bores.

8. The drawbar clevis assembly of claim 6, wherein:
    the first arm has a portion with a non-circular shape adjacent to the drawbar pin.

* * * * *